(12) United States Patent  (10) Patent No.: US 6,620,479 B2
Ito  (45) Date of Patent: Sep. 16, 2003

(54) OPTICAL DISK

(75) Inventor: Tomoaki Ito, Osaka (JP)

(73) Assignee: Orient Instrument Computer Company, Ltd. (JP)

( * ) Notice: Subject to any disclaimer, the term of this patent is extended or adjusted under 35 U.S.C. 154(b) by 155 days.

(21) Appl. No.: 09/951,675

(22) Filed: Sep. 14, 2001

(65) Prior Publication Data

US 2002/0031633 A1 Mar. 14, 2002

(30) Foreign Application Priority Data

Sep. 14, 2000 (JP) ........................................ 2000-280242

(51) Int. Cl.[7] ................................................. B32B 3/02
(52) U.S. Cl. ...................... 428/64.1; 428/64.4; 428/136; 369/273; 283/81
(58) Field of Search ............................. 428/64.1, 64.4, 428/136, 913; 430/270.11, 495.1, 945; 369/273, 283, 288; 283/81

(56) References Cited

U.S. PATENT DOCUMENTS 6,511,731 B2 * 1/2003 Clark .......................... 428/136

2002/0114921 A1 * 8/2002 Lee ............................. 428/136

FOREIGN PATENT DOCUMENTS

| JP | 63-124284 A | 5/1988 |
| JP | 10-138667 A | 5/1998 |
| JP | 3077936 U | 6/2001 |
| JP | 2001-266540 A | 9/2001 |
| JP | 3080848 U | 10/2001 |

* cited by examiner

Primary Examiner—Elizabeth Mulvaney
(74) Attorney, Agent, or Firm—Rothwell, Figg, Ernst & Manbeck; Stephen B. Parker, Esq.

(57) ABSTRACT

An optical disk includes a disk substrate made of synthetic resins and an elastic/non-elastic film for label printing. The disk substrate has a chucking central aperture, and the peripheral portion of the chucking central portion constitutes a clamping area. The film is fixed on an upper surface of the disk substrate so as to cover the chucking central aperture. In case of the elastic film, at least a portion of the film corresponding to the chucking central aperture expands/contracts in accordance with the movement of a disk chuck into/out of the chucking central aperture. On the other hand, in case of the non-elastic film, cuts are made in a portion corresponding to the chucking central aperture, whereby the cut portion of the film opens/closes in accordance with the movement of a disk chuck into/out of the chucking central aperture.

12 Claims, 6 Drawing Sheets

OPTICAL DISK

BACKGROUND OF THE INVENTION

1. Field of the Invention

The present invention relates to an optical disk such as the so-called CD and DVD, and more particularly to, an optical disk on which letters and/or patterns are printed.

In this specification, the wording of "CD" is used as a general term of a CD-DA (for musical use), a CD-ROM, a CD-R and the like. Furthermore, the wording of "DVD" is used as a general term of a DVD-Video, a DVD-ROM, a DVD-R and the like.

2. Description of Related Art

For example, as shown in FIGS. 8 and 9, a conventional compact disk 51 (hereinafter may referred to as "CD") is comprised of a transparent synthetic resin disk substrate 1 having a central chucking aperture 5. The peripheral portion of the chucking aperture constitutes a clamping area 6 having a certain width. On the upper surface of the annular area located outside the clamping area 6, an information-recording layer 2, a reflective layer 3 and a protection layer 4 are laminated in this order.

As shown in a FIG. 10, this compact disk 51 is placed on the disk turntable 83 in the disk player as a drive unit such that the disk chuck 84 is disposed in the chucking central aperture 5. Then, a disk clamper 85 is placed onto the compact disk 51. Thus, the compact disk 51 is clamped by and between the disk clamper 85 and the disk turntable 83. In this clamped state, the compact disk 51 rotates together with the disk turntable 83 and the disk clamper 85 by the motor 88 driving the disk turntable 83. At this time, the upper end of the disk chuck 84 is always located above the upper surface of the compact disk 51.

In this kind of compact disk, a true round disk having a diameter of 12 cm or 8 cm has been provided as a standard size compact disk. On the other hand, recently, as shown in FIG. 11, a rectangular compact disk 61 having a length of from about 85 mm to 89 mm and a width of from about 55 mm to 60 mm has also been proposed. This kind of compact disk 61 is called as a business card-shaped compact disk or a card-shaped compact disk (hereinafter referred to as "card-shaped compact disk") because of its specific size and configuration.

In this card-shaped compact disk 61, the surface is utilized for label printing. Thus, this card-shaped compact disk 61 can be used as a business card when a person's name, his/her company name, its telephone/facsimile numbers, etc., are printed thereon. Since this card-shaped compact disk 61 is a kind of compact disk, it is possible to record information in the information-recording layer. Accordingly, a person who obtained this card shaped compact disk 61 can read out the recorded information using a disk-driving device/disk player. Thus, this card-shaped compact disk 61 can function as the same information media as a standard compact disk.

However, in this kind of card-shaped compact disk 61, the chucking central aperture 5 has the some size as that of the 8 cm standard compact disk and the 12 cm standard compact disk, i.e., the diameter of about 1.5 cm, because the card-shaped compact disk 61 is also driven by the same disk-driving device/disk player for standard compact disks. Therefore, in a card-shaped compact disk 61, the rate of occupancy area of the chucking central aperture 5 is larger than that of standard compact disks 51. Accordingly, when this card-shaped compact disk 61 is observed as a business card, the existence of the chucking central aperture 5 looks quite strange and that the arrangement of letters to be printed thereon will be restricted greatly.

Furthermore, besides a business card, the card-shaped compact disk 61 may also be used as, for example, a compact disk for promoting certain music or a compact disk for storing game software. These compact disks may be required to imply the contents of the recorded information by printed patterns, pictures and/or letters thereon. In such a case, the restrictions of design such as illustrations and/or pictures to be printed on the surface of the disk due to the existence of the chucking central aperture 5 is larger than that of letter arrangements to be printed thereon.

Similarly, the aforementioned conventional round compact disk 51 has similar design restriction to be printed thereon. For example, in cases where Mt. Fuji is illustrated on the compact disk 51, the existence of the chucking central aperture 5 spoils the design as shown in FIG. 12.

SUMMARY OF THE INVENTION

It is an object of the present invention to provide an optical disk with design freedom of label printing while keeping the chucking ability.

According to a first aspect of the present invention, an optical disk includes a disk substrate made of transparent synthetic resins and an elastic film for label printing. The disk substrate has a chucking central aperture, and the peripheral portion of the chucking central portion constitutes a clamping area. The elastic film is fixed on the upper surface of the disk substrate so as to cover the chucking central aperture. Whereby at least a portion of the film corresponding to the chucking central aperture expands when a disk chuck for chucking the optical disk is inserted into the chucking central aperture and contracts when the disk chuck is pulled out of the chucking central aperture.

According to the present invention, since the chucking central aperture is covered by the elastic film, label printing on the film can be performed without being restricted by the existence of the chucking central aperture.

At the time of chucking the compact disk in a disk-driving device/disk player equipped with a disk clamper, the film covering the chucking central aperture is pushed up by the disk chuck, and a part of the film is chucked assuredly by and between the disk clamper and the disk chuck. Therefore, the compact disk can be chucked more firmly, which prevents rotational fluctuation of the compact disk.

In a disk-driving device in the so-called notebook computer which is not equipped with a disk clamper, the film covering the chucking central aperture is pushed up by a disk chuck when the disk chuck is inserted into the chucking central aperture. Therefore, engaging hooks of the disk chuck can be assuredly engaged with the inner edge of the clamping area of the compact disk, resulting in no chucking trouble.

When the compact disk is taken out of the disk-driving device/disk player after the releasing of the chucking, the portion of the film pushed up by the disk chuck returns to the original flat state because of its elasticity. Since the deformed patterns and/or letters due to the deformation of the film at the time of chucking will be restored in accordance with the releasing of the chucking, the design of the patterns and/or letters printed on the film will not be spoiled.

It is preferable that the film is made of vinyl chloride resins, polyolefin resins such as polypropylene or polyethylene, polyester resins such as polyethylene terephthalate, polyurethane resins, or latex, which is rich in elasticity.

In order to keep the deforming area of the film as large as possible and effectively prevent the film from being damaged at the time of chucking, it is preferable that the portion of the film corresponding to the clamping area of the disk substrate is not fixed to the disk substrate while the remaining portion is fixed.

In general, adhesive agent is employed to fix the film on the disk substrate. Alternatively, any other fixing method such as welding may be employed.

Furthermore, it is preferable that the film is a non-transparent laminated film comprising a film body and a metal deposition layer such as an aluminum deposition layer deposited on the rear surface of the film body because of the following reasons. In cases where the film is optically permeable, the portion of the disk where the reflective layer is provided and the remaining portion will be distinctively recognized as a background of the optical disk, resulting in a poor looking disk. To the contrary, in cases where the film includes a metal deposition layer, there will be no such drawback, resulting in a good-looking disk.

It is preferable that printings such as patterns and/or letters are formed on the rear surface of the film so as not to blur or fade away due to friction or the like.

It is preferable that the thickness of the film falls within the range of from about 0.01 to 0.03 mm because of the following reasons. When the thickness of the film exceeds about 0.01 mm, the amount (i.e., thickness) of the film to be disposed between a disk chuck and a disk clamper increases, resulting in inadequate pressing force onto the clamping area by the disk clamper, which may cause rotational fluctuation of the disk. On the other hand, when the thickness of the film is less than about 0.03 mm, the strength of the film becomes inadequate, which may cause breakage of the film.

According to the second aspect of the present invention, an optical disk includes a disk substrate made of transparent synthetic resins and a non-elastic film for label printing. The disk substrate has a chucking central aperture, and a peripheral portion of the chucking central portion constitutes a clamping area. The non-elastic film is fixed on an upper surface of the disk substrate so as to cover the chucking central aperture. The non-elastic film is provided with cuts at a portion corresponding to the chucking central aperture, whereby the cut portion opens when a disk chuck for chucking the optical disk is inserted into the chucking central aperture and closes when the disk chuck is pulled out of the chucking central aperture.

It is preferable that the non-elastic film is a paper having crossing cuts such as an X-shaped cuts.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
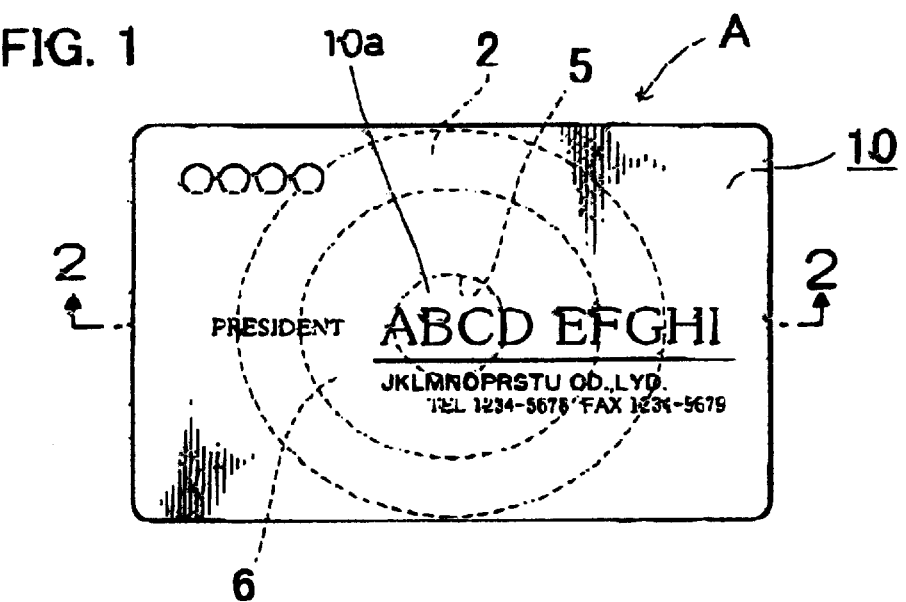
FIG. 1 is a plane view showing a card-shaped optical disk according to a first embodiment of the present invention.
Figure 2:
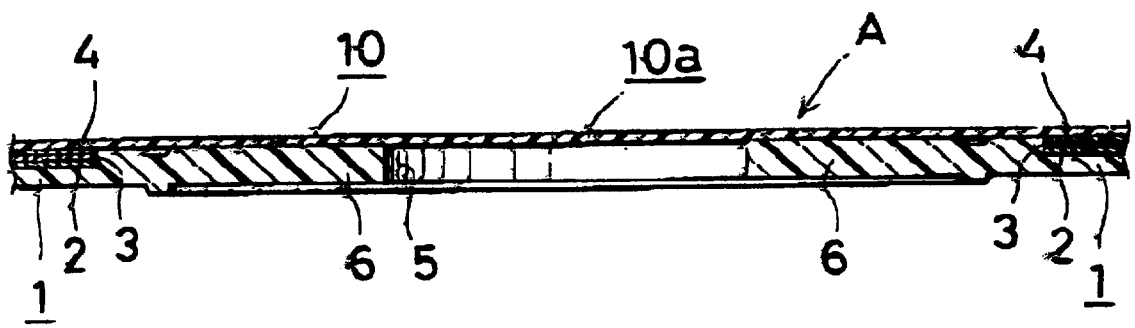
FIG. 2 is an enlarged cross-sectional view taken along the line 2—2 in FIG. 1.

FIGS. 1 and 2 show a card-shaped compact disk A which is an optical disk according to a first embodiment of the present invention.

FIG. 1 is a plane view showing this compact disk A, and FIG. 2 shows the enlarged cross-sectional view taken along the line 2—2 in FIG. 1.

As shown in FIG. 1, this compact disk A has a rectangular plane shape having a dimension of 58 mm width×85 mm length. In the center portion of the compact disk A, a circular chucking central aperture 5 is provided as shown by the broken line. The peripheral portion of the chucking central aperture 5 constitutes an annular clamping area 6 for clamping this compact disk A.

This compact disk A includes a rectangular disk substrate 1 made of synthetic resins having the aforementioned dimension. On the annular portion of a predetermined width located outside the clamping area 6, an information-recording layer 2, a reflective layer 3 and a protection layer 4 are laminated in this order. Furthermore, as shown in FIG. 2, a film 10 on which label printing was performed is disposed on the entire upper surface of the disk substrate 1 of this compact disk A so as to cover the chucking central aperture 5. Therefore, the chucking central aperture 5 cannot be observed from the above.

Figure 3:
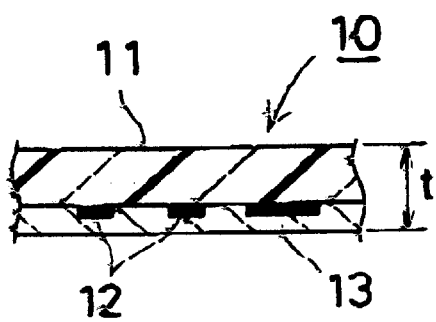
FIG. 3 is an enlarged cross-sectional view of a film to be adhered on a disk substrate.

As shown in FIG. 3, the film 10 consists of a flexible vinyl-chloride film 11 which is rich in elasticity, printed portions 12 such as printed letters and/or patterns formed on the rear surface of the vinyl-chloride film 11 and an aluminum vacuum evaporation layer 13 formed on the entire rear surface of the vinyl film 11 so as to cover the printed portions 12. The entire thickness of the film 10 is 0.02 mm.

This film 10 is adhered on the protection layer 4 and the remaining area located outside the protection layer 4 via an adhesive layer (not shown). Thus, the film 10 is not fixed to the area 10a corresponding to the chucking central aperture 5 and the clamping area 6.

In this compact disk A, since the upper end opening of the chucking central aperture 5 is covered by the film 10, patterns and/or letters can be printed on the entire surface of the film 10 regardless of the existence of the chucking central aperture 5. Therefore, it becomes possible to avoid design restrictions inherent in conventional optical disks due to the existence of the chucking central aperture 5. Furthermore, since the film 10 includes the aluminum vacuum evaporation layer 13 on the rear surface of the vinyl-chloride film 11, the ring shaped reflective layer 3 cannot be recognized from the above.

Figure 4:
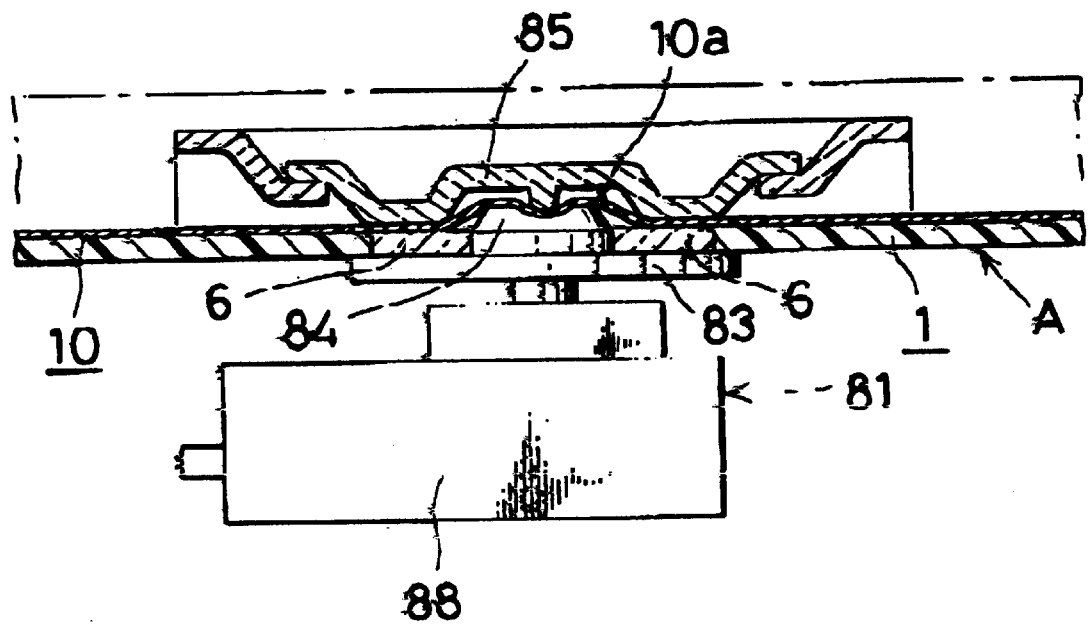
FIG. 4 is an enlarged cross-sectional view of a principal part of a disk player with a disk clamper at the time of chucking.

When this compact disk A is loaded in a disk player equipped with a disk clamper, the disk chuck 84 ascends toward the chucking central aperture 5. At this time, the chucking central aperture 5 is covered by the film 10. However, as shown in FIG. 4, since this film 10 is an elastic member as mentioned above, the film 10 can be pushed up by the disk chuck 85. Furthermore, since this film 10 is not adhered to the area 10a corresponding to the chucking central aperture 5 and the clamping area 6 located outside the chucking central aperture 5 as mentioned above, the film 10 can be easily deformed and pushed up by the disk chuck 84.

The compact disk A can be clamped assuredly in the state that the portion 10a corresponding to the chucking central aperture 5 and its peripheral portion are clamped by and between the disk chuck 84 and the disk clamper 85 as shown in FIG. 4.

Since the clamping of the film 10 is also performed by the film 10 interposed between the disk chuck 84 and the disk clamper 85, the clamping is performed more assuredly as compared with a normal clamping in which the film is not interposed therebetween. This prevents rotational fluctuation of the compact disk A.

When the disk chuck 84 descends, the film 10 is released from the pressing force of the disk chuck 84. Since the film 10 is an elastic member, the portion 10a corresponding to the chucking central aperture 5 and the peripheral portion thereof returns to the original flat state. In this returned state, the letters and/or patterns 12 deformed at the time of chucking will also be restored.

As will be apparent from the above, since the film 10 can be expanded and contracted with the ascending/descending movement of the disk chuck 84, the disk chuck 84 can be inserted and pulled out of the chucking central aperture 5.

Figure 5:
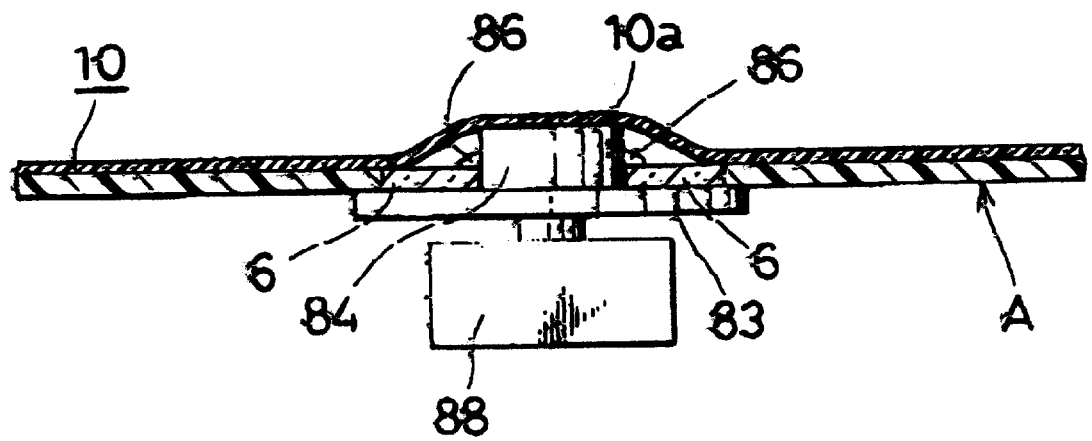
FIG. 5 is an enlarged cross-sectional view of a principal part of a disk-driving device equipped in the so-called notebook personal computer at the time of chucking.

On the other hand, in a disk-driving device equipped in the so-called notebook computer in which no disk clamper is provided, as shown in FIG. 5, the disk chuck 84 ascends toward the chucking central aperture 5. At this time, the chucking central aperture 5 is covered by the film 10. However, since this film 10 is an elastic member as mentioned above, the film 10 is pushed up by the disk chuck 84. Therefore, stoppers 86 provided at the disk chuck 84 can be engaged with the inner peripheral edge of the disk substrate 1 without being interfered with the film 10.

When the disk chuck 84 descends to release the chucking, the film 10 is released from the pressing force of the disk chuck 84. Since the film 10 is an elastic member, the portion 10a corresponding to the chucking central aperture 5 and the peripheral portion thereof returns to the original flat state. In this returned state, the letters and/or patterns 12 deformed by the disk chuck 84 at the time of chucking will also be restored.

Figure 6:
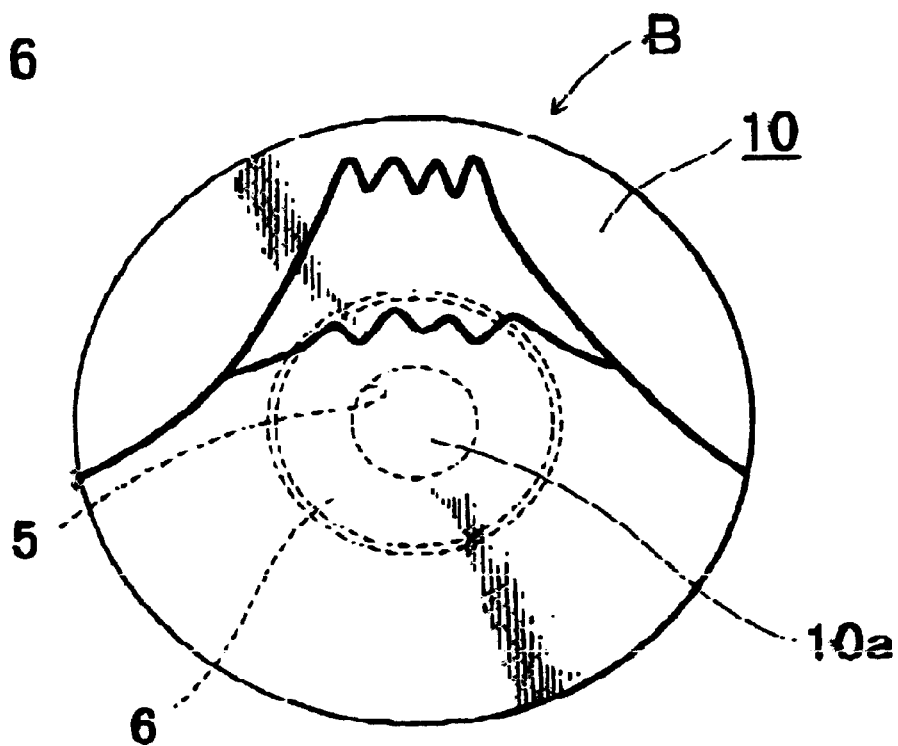
FIG. 6 is a plane view showing an optical disk of a standard size according to a second embodiment of the present invention.

Next, a second embodiment of the present invention will be explained with reference to FIG. 6. In this embodiment, the compact disk B is a standard optical disk having a diameter of 12 cm.

Although the fundamental structure of this compact disk B is the same as that of conventional optical disks, it is different in that a film 10 is disposed on the entire surface of the disk substrate so as to cover the chucking central aperture 5. The structure and the adhered portion of the film 10 are the same as those of the first embodiment, and therefore the explanation thereof will be omitted by allotting the same reference numeral to the corresponding portion.

In this film 10, Mt. Fuji is illustrated thereon. If the same illustration is applied to a conventional compact disk 51, the chucking central aperture 5 will be exposed at the center of the illustration, resulting in a poor looking disk. However, according to the compact disk B of this embodiment, since the chucking central aperture 5 is not exposed, the illustration will not be spoiled.

Since the movement/behavior of the film 10 at the time of chucking/releasing this compact disk B is the same as that of the first embodiment, the explanation will be omitted.

Figure 7:
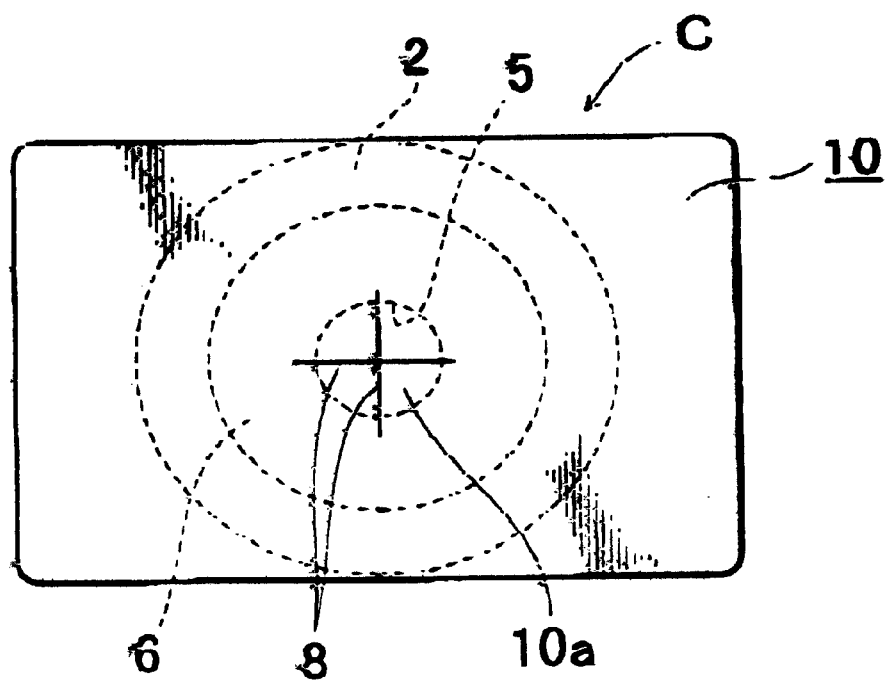
FIG. 7 is a plane view showing an optical disk with a paper adhered thereon according to a third embodiment of the present invention.
Figure 8:
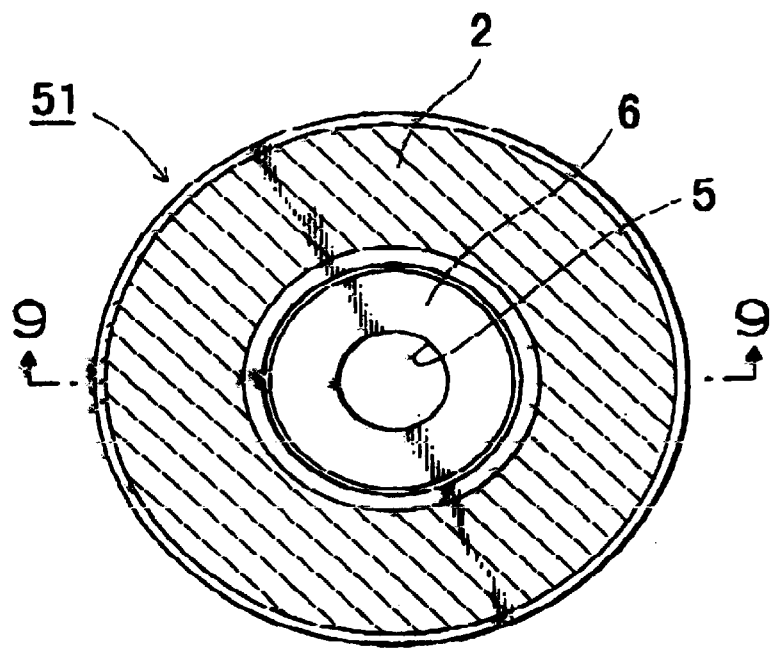
FIG. 8 is a plane view showing a conventional compact disk of standard size.
Figure 9:
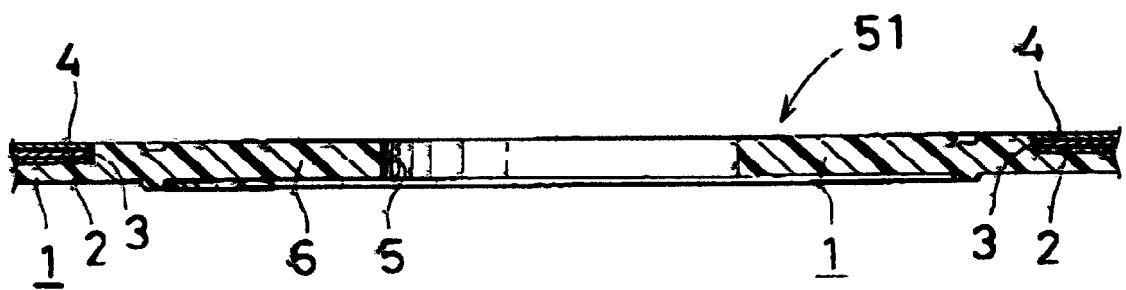
FIG. 9 is an enlarged cross-sectional view taken along the line 9—9 in FIG. 8.
Figure 10:
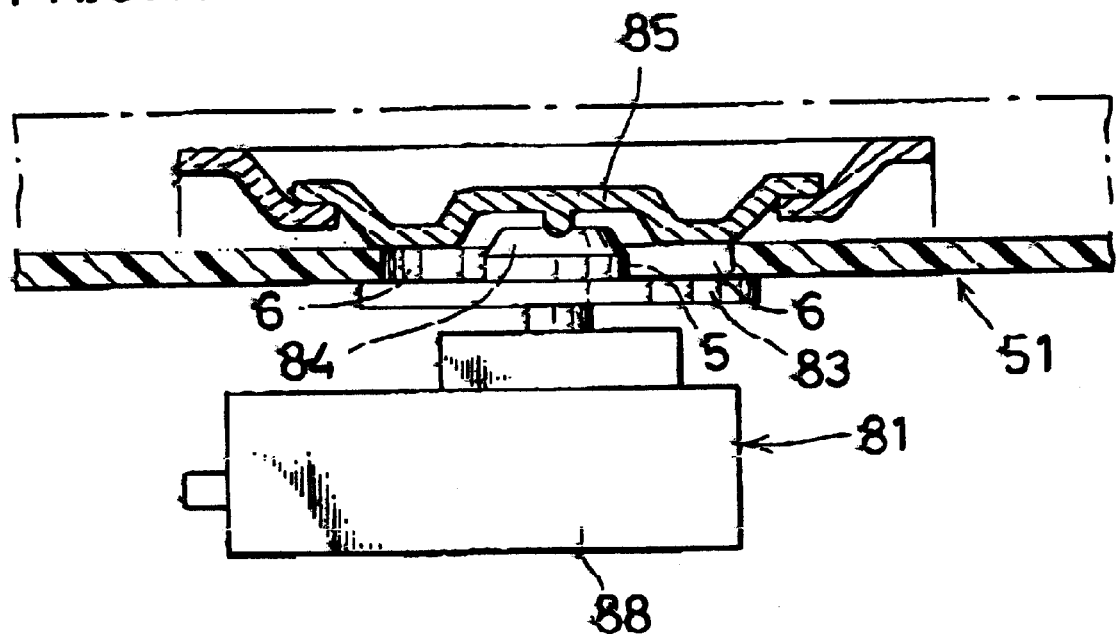
FIG. 10 is an enlarged cross-sectional view showing a principal part of a disk player at the time of chucking.
Figure 11:
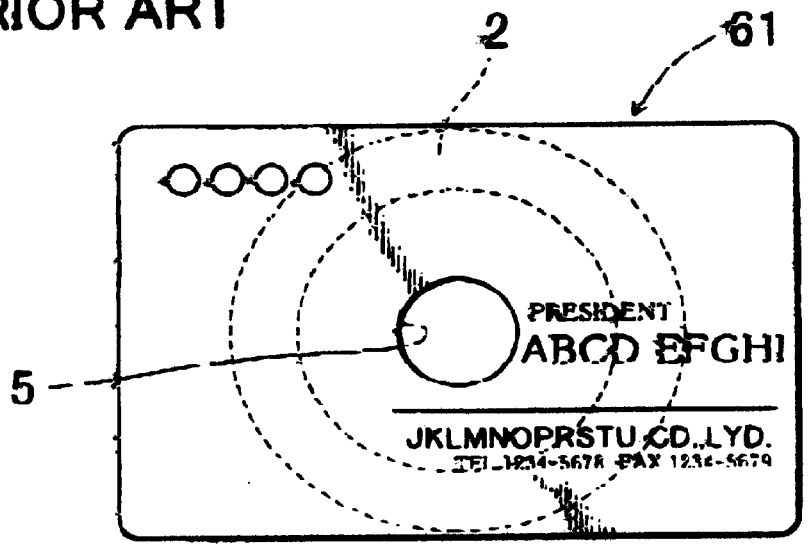
FIG. 11 is a plane view showing a conventional card-shaped compact disk.
Figure 12:
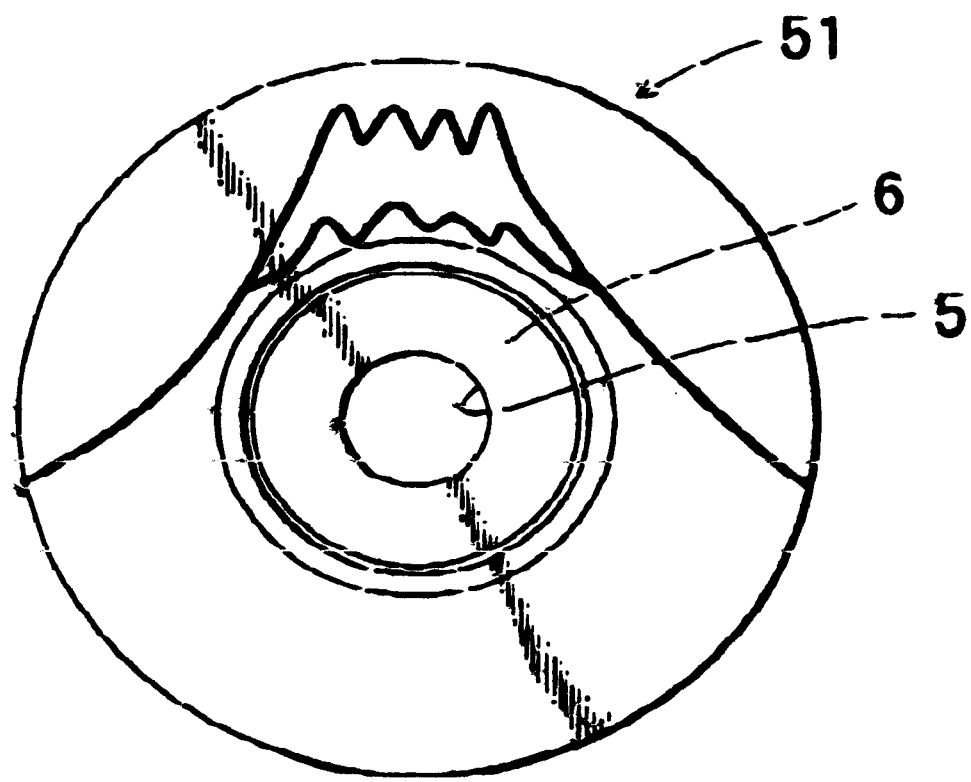
FIG. 12 is a plane view showing a conventional compact disk of conventional standard size with an illustration.

Next, a third embodiment of the present invention will be explained with reference to FIG. 7. In this embodiment, the compact disk C is formed into a card-shape.

Although the fundamental structure of this compact disk C is the same as that of the first embodiment, it is different in that a paper is used as the film 10. The explanation of the same portions as in the first embodiment will be omitted by allotting the same reference numeral to the corresponding portion.

Since this film 10 is made of paper, it does not have elasticity like the film as explained in the first and second embodiments. Accordingly, in this film 10, crossing cuts 8 are made in the portion 10a corresponding to the chucking central aperture 5. In FIG. 7, the cuts 8 are illustrated with thick lines, which may look to spoil the design applied on the film 10, for the purpose of easy understanding. However, in the actual product, the cuts are made by a very thin cutter so that a user cannot recognize them easily. Thus, the design applied to the film 10 will not be spoiled by the cuts 8.

With the compact disk C equipped with this film 10, the portion of the film 10 near the cuts 8 opens with easy by the disk chuck 84 at the time of chucking. Therefore, the chucking operation can also be performed assuredly.

In cases where a paper is used as the film 10, since the paper has no elasticity, a part of the paper clamped by the disk clamper 85 and the disk chuck 84 of the disk player equipped with a disk clamper 85 may be wrinkled. However, the wrinkled portion can be restored easily by stretching it.

In cases where the compact disk C is inserted into a disk-driving device equipped in the so-called notebook computer having no disk clamper, the portion of the film 10 corresponding to the chucking central aperture 5 is merely pushed up by the disk chuck 84. Therefore, when the push-up status by the disk chuck 84 is released, the pushed-up portion of the film 10 will descend automatically and return to the original closed state. In this case, the original printings will be restored without stretching the film 10.

In the aforementioned first and second embodiments, an elastic vinyl chloride resin film is used as the film 10. However, the present invention allow to use, for example, a polyolefin resin film such as polypropylene film or a polyethylene film, a polyester resin film such as a polyethylene terephthalate film, a polyurethane resin film, or a latex film, which is rich in elasticity. Furthermore, as explained in the third embodiment, the film 10 may be a non-elastic member such as a paper having cuts formed in the portion corresponding to the chucking central aperture 5.

In order to keep the deforming area of the film 10 as large as possible and effectively prevent the film 10 from being damaged at the time of chucking, it is preferable that the portion of the film 10 corresponding to the clamping area 6 of the disk substrate is not fixed to the disk substrate while the remaining portion is fixed.

In the aforementioned embodiments, the film 10 is adhered on the disk substrate via an adhesive layer. However, in the present invention, any other fixing method such as welding may be employed.

In cases where the film 10 is optically permeable, a part of the disk where the reflective layer 3 is provided and the remaining part thereof will be recognized distinctly as a background of the compact disk, resulting in a poor looking disk. To the contrary, in cases where the film 10 includes a metal deposition layer 13, there will be no such drawbacks, resulting in a good looking disk. Accordingly, it is preferable that the film 10 is a non-transparent laminated film comprising a film body 11 and a metal deposition layer 13 such as an aluminum deposition layer deposited on the rear surface of the film body 11.

It is preferable that printings such as patterns and/or letters are formed on the rear surface of the film so as not to blur or wear out due to friction or the like.

When the thickness of the film 10 exceeds about 0.01 mm, the amount (i.e., thickness) of the film 10 to be disposed between a disk chuck 84 and a disk clamper 85 will increase, resulting in inadequate pressing force onto the clamping area by the disk clamper 85, which may cause rotational fluctuation of the compact disk. On the other hand, when the thickness of the film 10 is less than about 0.03 mm, the strength of the film becomes inadequate, which may cause breakage of the film 10. Accordingly, it is preferable that the thickness of the film 10 falls within the range of from about 0.01 to 0.03 mm.

This application claims priority to Japanese Patent Application No. 2000-280242 filed on Sep. 14, 2000, the disclosure of which is incorporated by reference in its entirety.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. An optical disk, comprising:
   a disk substrate made of transparent synthetic resins, wherein said disk substrate has a chucking central aperture, and a peripheral portion of said chucking central portion constitutes a clamping area; and
   an elastic film for label printing, said elastic film being fixed on an upper surface of said disk substrate so as to cover said chucking central aperture, whereby at least a portion of said film corresponding to said chucking central aperture expands when a disk chuck for chucking said optical disk is inserted into said chucking central aperture and contracts when said disk chuck is pulled out of said chucking central aperture.

2. The optical disk as recited in claim 1, wherein said film is fixed to a portion of said disk substrate except for said clamping area.

3. The optical disk as recited in claim 1, wherein said film is an elastic synthetic resin film.

4. The optical disk as recited in claim 3, wherein said film is a film selected from the group consisting of a vinyl chloride resin film, a polyolefin resin film, a polyester resin film and a polyurethane resin film.

5. The optical disk as recited in claim 1, wherein said film is made of latex.

6. The optical disk as recited in claim 1, wherein said film is a non-transparent film.

7. The optical disk as recited in claim 1, wherein said film is provided with a metal deposition layer formed on a rear surface thereof.

8. The optical disk as recited in claim 1, wherein said film includes an elastic synthetic resin film, a label printing formed on a rear surface of said film and a metal deposition layer formed on said rear surface.

9. The optical disk as recited in claim 1, wherein a thickness of said film falls within a range of from about 0.01 to 0.03 mm.

10. The optical disk as recited in claim 1, wherein said disk substrate is formed into a rectangular shape.

11. An optical disk, comprising:
    a disk substrate made of transparent synthetic resins, wherein said disk substrate has a chucking central aperture, and a peripheral portion of said chucking central portion constitutes a clamping area; and
    a non-elastic film for label printing, said non-elastic film being fixed on an upper surface of said disk substrate so as to cover said chucking central aperture,
    wherein said non-elastic film is provided with cuts in a portion corresponding to said chucking central aperture, whereby a cut portion of said film opens when a disk chuck for chucking said optical disk is inserted into said chucking central aperture and closes when said disk chuck is pulled out of said chucking central aperture.

12. The optical disk as recited in claim 11, wherein said non-elastic film is a paper having crossing cuts formed in a potion corresponding to said chucking central aperture.

* * * * *